US007525203B1

(12) United States Patent
Racho (10) Patent No.: US 7,525,203 B1
(45) Date of Patent: Apr. 28, 2009

(54) BACK-UP ELECTRIC POWER GENERATOR FOR ELECTRONIC COMPONENTS ATTACHED TO AUTOMATIC FIREARMS

(76) Inventor: Jeffrey Racho, P.O. Box 486, Hazleton, PA (US) 18201

( * ) Notice: Subject to any disclaimer, the term of this patent is extended or adjusted under 35 U.S.C. 154(b) by 0 days.

(21) Appl. No.: 11/502,240

(22) Filed: Aug. 10, 2006

Related U.S. Application Data

(60) Provisional application No. 60/707,270, filed on Aug. 11, 2005.

(51) Int. Cl.
    *F02B 63/04*  (2006.01)
    *H02K 41/00*  (2006.01)
    *H02K 33/00*  (2006.01)
    *H02K 35/00*  (2006.01)
    *B60Q 1/00*   (2006.01)
    *B60Q 1/26*   (2006.01)
    *F21L 13/00*  (2006.01)

(52) U.S. Cl. .................. 290/1 R; 310/12; 310/17; 310/30; 362/192

(58) Field of Classification Search ............ 290/1 R; 362/192; 310/12, 17, 30
See application file for complete search history.

(56) References Cited

U.S. PATENT DOCUMENTS

| 910,276 | A | * | 1/1909 | Easdále ........................ 42/74 |
|---|---|---|---|---|
| 3,273,553 | A | * | 9/1966 | Doyle ........................... 124/3 |
| 3,795,998 | A | * | 3/1974 | Kuhl ............................ 42/74 |
| 4,140,932 | A | * | 2/1979 | Wohlert ....................... 310/15 |
| 5,074,189 | A | * | 12/1991 | Kurtz ......................... 89/135 |
| 5,347,186 | A | * | 9/1994 | Konotchick ................... 310/17 |
| 5,704,153 | A | * | 1/1998 | Kaminski et al. ........... 42/70.11 |
| 5,818,132 | A | * | 10/1998 | Konotchick ................... 310/17 |
| 5,975,714 | A | * | 11/1999 | Vetorino et al. ............ 362/192 |
| 6,220,719 | B1 | * | 4/2001 | Vetorino et al. ............ 362/192 |
| 6,412,207 | B1 | * | 7/2002 | Crye et al. ................. 42/70.06 |
| 6,481,142 | B1 | * | 11/2002 | McCarthy ....................... 42/74 |
| 6,481,143 | B2 | * | 11/2002 | McCarthy ....................... 42/74 |
| 6,522,603 | B1 | * | 2/2003 | Miyahara et al. ............ 368/203 |
| 6,671,153 | B1 | * | 12/2003 | Ker et al. .................... 361/111 |
| 6,729,744 | B2 | | 5/2004 | Mah .......................... 362/192 |
| 6,768,230 | B2 | * | 7/2004 | Cheung et al. ................ 310/30 |
| 6,798,090 | B2 | * | 9/2004 | Cheung et al. ................ 310/17 |
| 6,808,288 | B2 | * | 10/2004 | Mah .......................... 362/192 |
| 6,809,427 | B2 | * | 10/2004 | Cheung et al. .............. 290/1 R |
| 6,812,583 | B2 | * | 11/2004 | Cheung et al. .............. 290/1 R |
| 6,812,598 | B2 | * | 11/2004 | Cheung et al. ................ 310/30 |
| 6,861,772 | B2 | * | 3/2005 | Cheung et al. ................ 310/30 |
| 6,893,141 | B2 | * | 5/2005 | Mah .......................... 362/192 |
| 6,936,937 | B2 | * | 8/2005 | Tu et al. ...................... 310/12 |

(Continued)

*Primary Examiner*—Nicholas Ponomarenko
*Assistant Examiner*—Pedro J Cuevas
(74) *Attorney, Agent, or Firm*—Panitch Schwarze Belisario & Nadel LLP (57) ABSTRACT

A firearm improvement taking the form of a mechanical dynamo installed in an automatic firearm. Several components either replace certain parts of the firearm or are added to the firearm. In conjunction with the operation of the firearm, the components generate electric energy which is then stored in a capacitor, battery, or other element for the storage of electric energy, or supply power to a battery recharging unit attached to the firearm. The electric energy contained in the storage component, or used to recharge the batteries placed in the recharging unit, may be used at a later time as a back-up power supply for electronic components attached to or incorporated into the firearm, such as red-dot or reflex sights, laser sighting equipment, or night vision equipment.

20 Claims, 5 Drawing Sheets

U.S. PATENT DOCUMENTS

| | | | |
|---|---|---|---|
| 6,952,060 B2 * | 10/2005 | Goldner et al. | 310/12 |
| 6,982,497 B2 * | 1/2006 | Rome | 290/1 A |
| 6,994,450 B2 * | 2/2006 | Mah | 362/192 |
| 7,009,310 B2 * | 3/2006 | Cheung et al. | 290/1 R |
| 7,009,315 B2 * | 3/2006 | Takeuchi | 310/15 |
| 7,089,043 B2 * | 8/2006 | Tu et al. | 455/573 |
| 7,102,244 B2 * | 9/2006 | Hunter, Jr. | 290/1 R |
| 7,124,529 B1 * | 10/2006 | Havelka, Jr. | 42/74 |
| 7,148,583 B1 * | 12/2006 | Shau et al. | 290/1 R |
| 7,229,188 B2 * | 6/2007 | Mah | 362/192 |
| 7,232,238 B2 * | 6/2007 | Long et al. | 362/192 |
| 7,288,860 B2 * | 10/2007 | Cheung et al. | 310/12 |
| 2003/0034697 A1 * | 2/2003 | Goldner et al. | 310/17 |
| 2004/0008510 A1 * | 1/2004 | Mah | 362/192 |
| 2005/0151375 A1 * | 7/2005 | Cheung et al. | 290/1 R |
| 2005/0206247 A1 * | 9/2005 | Stewart et al. | 310/12 |
| 2005/0235865 A1 * | 10/2005 | Kumar | 105/61 |
| 2006/0050504 A1 * | 3/2006 | Mah | 362/192 |
| 2006/0237968 A1 * | 10/2006 | Chandrasekaran | 290/1 R |
| 2007/0228734 A1 * | 10/2007 | Gerfast | 290/1 R |
| 2007/0268689 A1 * | 11/2007 | Mah | 362/192 |
| 2008/0074083 A1 * | 3/2008 | Yarger et al. | 320/137 |
| 2008/0184607 A1 * | 8/2008 | Engel et al. | 42/75.01 |

* cited by examiner

Fig. 1

(prior art)

Fig. 2

(prior art)

BACK-UP ELECTRIC POWER GENERATOR FOR ELECTRONIC COMPONENTS ATTACHED TO AUTOMATIC FIREARMS

CROSS REFERENCE TO RELATED APPLICATIONS

This nonprovisional patent application claims the benefit of the filing date of provisional application 60/707,270, filed Aug. 11, 2005, which is herein incorporated by reference.

BACKGROUND OF THE INVENTION

A review of certain aspects of the background of the invention provides insight into how the invention operates and the benefits provided by the invention. A discussion of the use and limitations of electronic sighting equipment for firearms is presented, followed by a discussion of the operation of semiautomatic firearms and then by an overview of the theory and application of electromagnetic induction.

Firearm Sights

Operators of firearms traditionally used "iron sights" to designate their targets. These iron sights generally consist of a blade or post attached at the muzzle end of the firearm's barrel and a peephole or notch sight at the breech end of the firearm's barrel. Iron sights have certain disadvantages and are often replaced or augmented with newer types of sights, such as laser sights, red-dot/reflex sights, and holographic sights, which provide advantages such as allowing the shooter to more precisely designate the target, allowing the shooter to keep both eyes open while locating the target (meaning the shooter has a better field of view of his/her surroundings while operating the firearm), and reducing the amount of time it takes the shooter to properly designate the target. Iron sights, unless they are augmented by certain equipment, such as tritium inserts, are difficult to use in low light levels or at night; consequently, night-vision equipment or infrared laser sights must be attached to the firearm so that the shooter may use the firearm in such conditions.

Although the alternative sights and sighting equipment described above provide notable improvements over iron sights, they generally take the form of electronic devices which must draw power from either installed batteries or an external power unit (one notable exception is the ACOG, or Advanced Combat Optical Gunsight, which uses a tritium insert for illumination purposes). The sight or sighting equipment will fail to operate without this power source, rendering it useless and either requiring the shooter to return to using the firearm's iron sights or to replace the power source of the sight. Considering that some firearms, such as the M-4 flattop carbine, may have no iron sights whatsoever and may rely solely on electronic sighting equipment, it is imperative that the shooter have an adequate source of back-up power should the power source powering the sighting equipment fail. If the shooter is a combat soldier relying on a piece of electronic sighting equipment, failure to carry a source of back-up power could leave the soldier stranded in the field with a firearm which he cannot properly aim. This situation could lead to tragic results for the soldier or his unit.

Automatic Firearm Operation

Automatic firearms use a portion of the expanding gas from the burning of the gunpowder in a cartridge to provide kinetic energy which moves parts of the firearm to eject the spent casing from the fired cartridge and to load a new cartridge into the firing chamber of the firearm.

Automatic firearms perform this operation through several methods, including the following two relevant methods:

(1) the "recoil operation" method, based upon Newton's Third Law of Motion, in which the force of the expanding propellant gas pushing against the bullet also operates to move the bolt, thereby ejecting the spent casing and loading a new cartridge into the firing chamber, and (2) the "gas actuation" method, in which a portion of the propellant gas is diverted from the firearm's barrel and acts upon components of the firearm, such as a piston, which then act to move the bolt, thereby ejecting the spent casing and loading a new cartridge into the firing chamber.

Generally, automatic pistols use recoil operation (although some exceptions exist, such as the Heckler & Koch P-7 pistol) while automatic rifles use gas actuation (again, exceptions exist).

Rifles using gas actuation are usually of two types:

(1) those which use a piston to transfer the energy from the expanding gas to move the bolt backwards, a system found in the M-1 Garand, AK-47 and its derivatives, and certain Heckler & Koch rifles, including the G-36 and XM-8, and (2) those which use a direct impingement method in which the gas is diverted from the barrel, through a gas tube, and directly acts against the bolt or a bolt carrier assembly to move the bolt backwards, a system found on the AR-15 rifle and its derivatives.

The description of an embodiment of the invention in this application shall be described for its embodiment in the AR-15 rifle (which includes the M-16 and M-4 military rifles), although the invention can be applied to firearms which use either the gas actuation method or the recoil operation method.

Electromagnetic Induction

An embodiment of the invention uses the principle of electromagnetic induction to transform the energy of the propellant gas of a fired cartridge, as it operates on the mechanical parts of the firearm, to produce an electric current which is then stored in a capacitor, battery, or other device for the storage of electric energy.

Under the principle of electromagnetic induction, an electric current will flow in a closed conductor, such as a loop of copper wire, when the magnetic flux through the plane bounded by the closed conductor changes. This current will be caused by either a change in the magnitude of the magnetic flux or if the bounded area is moved through the magnetic flux. If the closed conductor is a loop of conductive wire, or a wire formed into a group of loops, the electromotive force ("EMF") induced by the change of the magnetic flux is determined by Equation 1:

$$\epsilon = -(N)*(d\Phi/dt)$$

In Equation 1, epsilon ("$\epsilon$") is the EMF in volts, "N" is the number of loops of the conductive wire, "t" is time in seconds and phi ("$\Phi$") is the magnetic flux in units of volt-seconds (V*s, or webers). According to the equation, the induced EMF is directly proportional to both the number of loops of wire and the rate of change of the magnetic flux; hence, a greater EMF results for a greater number of loops of wire.

Electromagnetic induction is the basis of electric generators and alternators (generators which produce an alternating current). If a mechanical assembly moves a magnet's position relative to a set of loops of wire, or moves a set of loops of wire relative to a magnet, the assembly causes a current to flow in the wire; the assembly thus acts as a transducer turning the mechanical motion of the assembly into an electromotive force.

One notable consumer electronics device which is based upon the principle of electromagnetic induction is the "Faraday flashlight," fully described by U.S. Pat. No. 6,994,450; No. 6,893,141; No. 6,808,288; and No. 6,729,744.

BRIEF SUMMARY OF THE INVENTION

An embodiment of the present invention is a firearm improvement taking the form of a mechanical device attached to an automatic firearm (collectively referring to a "semi-automatic," "fully automatic," or "selective fire" firearm) which acts as a dynamo, or electric generator. The invention comprises several components which either replace certain parts of the firearm or are added to the firearm. In conjunction with the operation of the firearm, the device generates electric energy which is then stored in a capacitor, battery, or other component for the storage of electric energy, or supplies power to a battery-recharging unit attached to the firearm. The electric energy contained in the storage component, or used to recharge the batteries placed in the recharging unit, may be used at a later time as a back-up power supply for electronic components attached to or incorporated into the firearm, such as red-dot or reflex sights, laser sighting equipment, or night vision equipment.

The invention is a device for generating and storing electric power and attached to, or made a part of, a weapon comprised of a plurality of components. The invention comprises a magnet (generating a magnetic field) installed in or on a first component of the weapon, a conductor assembly comprising a plurality of loops of electrically conductive wire installed in or on a second component of the weapon so that the loops of electrically conductive wire are moved through the magnetic field when the weapon is operated, a rectifier or diode attached to the conductor assembly by a first set of electrically conductive wires, and an electric power storage unit attached to the rectifier or diode by a second set of electrically conductive wires.

BRIEF DESCRIPTION OF THE DRAWING

Referring now to the drawing, in which like reference numbers refer to like elements throughout the various figures that comprise the drawing. Included in the drawing are the following figures.

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity.

DETAILED DESCRIPTION OF THE INVENTION

In one embodiment, the invention is an assembly comprising a group of mechanical components which are either added to an automatic firearm or which are derivatives of existing parts of an automatic firearm and then substituted for the original parts of an automatic firearm. A person skilled in the arts of manufacturing and/or designing mechanical devices may make the invention from modifications to existing rifle parts, by manufacturing rifle parts with the described modifications to certain standards, and by the addition of other pre-manufactured parts to complete the invention.

Although this application describes the necessary modifications which must be made to an AR-15 rifle to implement the invention, those skilled in the arts of mechanical component manufacture and/or design will be able to make appropriate modifications to other automatic firearms in order to implement the invention on such firearms. As the AR-15 design is widely used by various military units of the United States, the preferred embodiment of the invention is the installation of the invention on an AR-15 rifle as described herein using nonconductive and nonferrous material, such as polycarbonate, for the construction of the buffer body and buffer tube.

Description of Original Components

Figure 1:
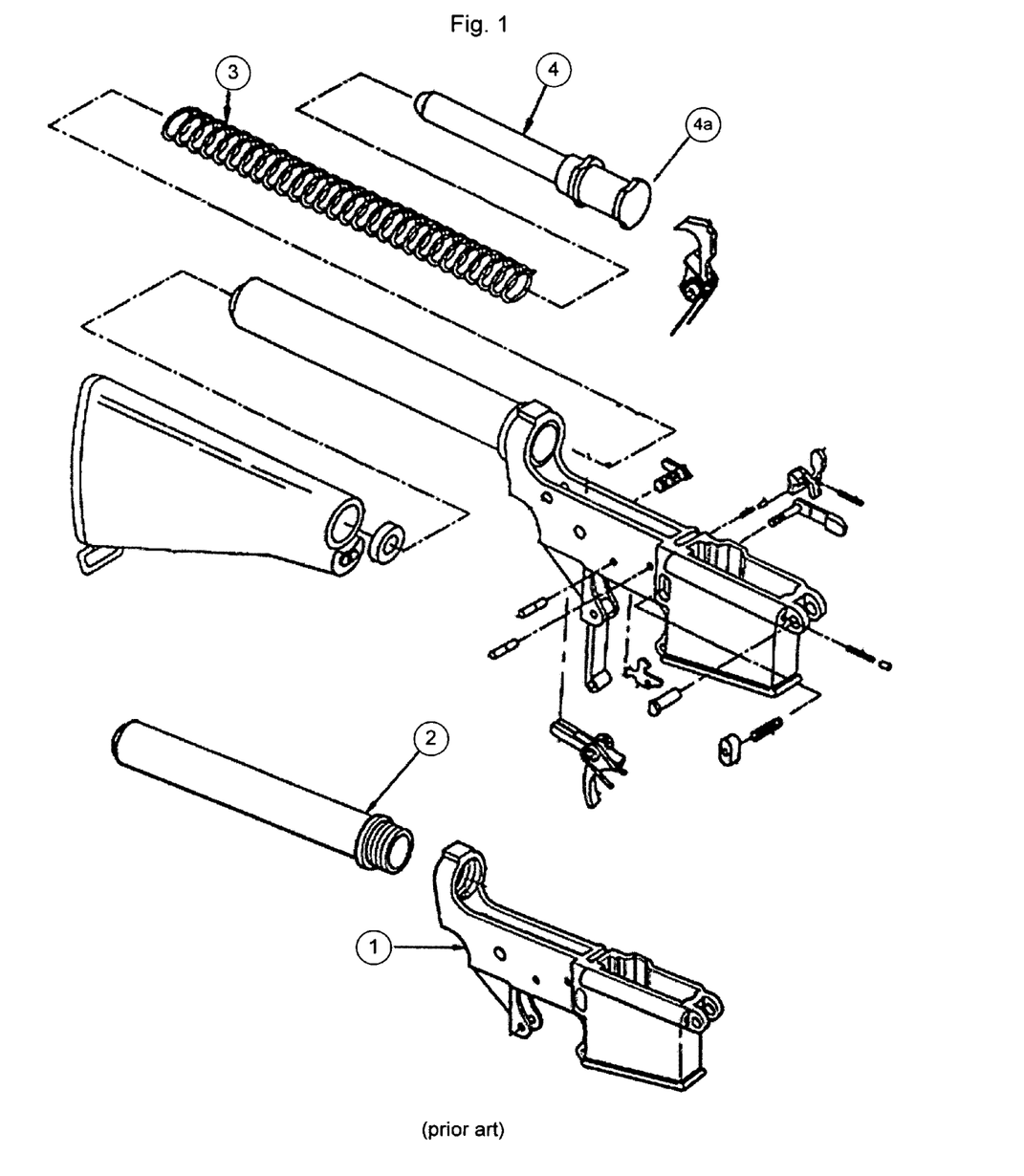
FIG. 1 depicts the Lower Assembly of an unmodified AR-15 rifle in a disassembled state.
Figure 2:
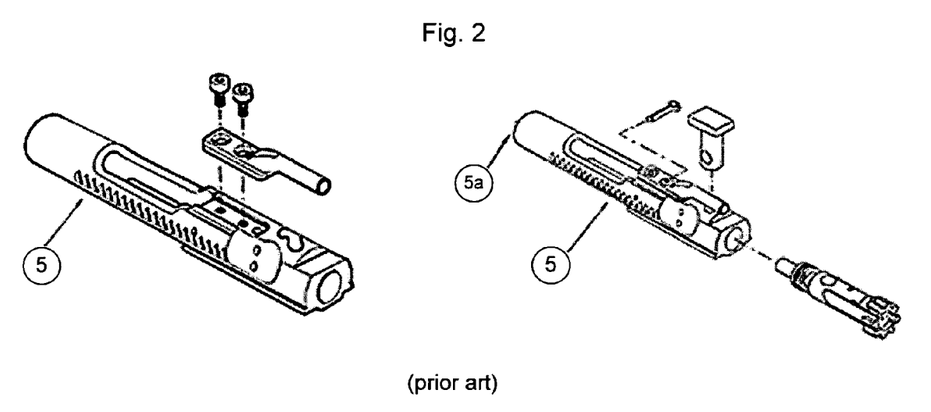
FIG. 2 depicts the Bolt Carrier of an unmodified AR-15 rifle in a disassembled state.

FIGS. 1 and 2 illustrate certain components of the AR-15 rifle.

FIG. 1 depicts the AR-15 Lower Assembly, which includes the Lower Receiver (1), the Buffer Tube (2), the Buffer Spring (3), and the Buffer Body (4), the front face of which (4a) lies flush against the rear of the Bolt Carrier.

FIG. 2 depicts the AR-15 Bolt Carrier which is enclosed within the Lower Assembly and Upper Assembly (not pictured) in the fully assembled AR-15 rifle. The Bolt Carrier (5) encloses the bolt (not labeled) which is carried within the Bolt Carrier, the rear face of which (5a) lies flush against the front of the Buffer Body (4a).

When the rifle is fired, gas from the fired cartridge enters a gas tube connected to the rifle barrel via a gas port (not pictured). The gas tube carries the expanding gas to the front of the Bolt Carrier, where the gas pushes against the Bolt Carrier, moving it backward against the Buffer Body. The Buffer Body moves backward through the Buffer Tube and against the Buffer Spring. As the Bolt Carrier moves backwards, it removes the spent cartridge from the rifle's firing chamber and ejects it.

The Buffer Spring stores the mechanical energy imparted to it, and then pushes against the Buffer Body, which pushes against the Bolt Carrier. The Bolt Carrier then grips and inserts a new cartridge into the firing chamber of the rifle, which may be fired again, after which the process repeats.

Invention Components/Modifications

Figure 3:
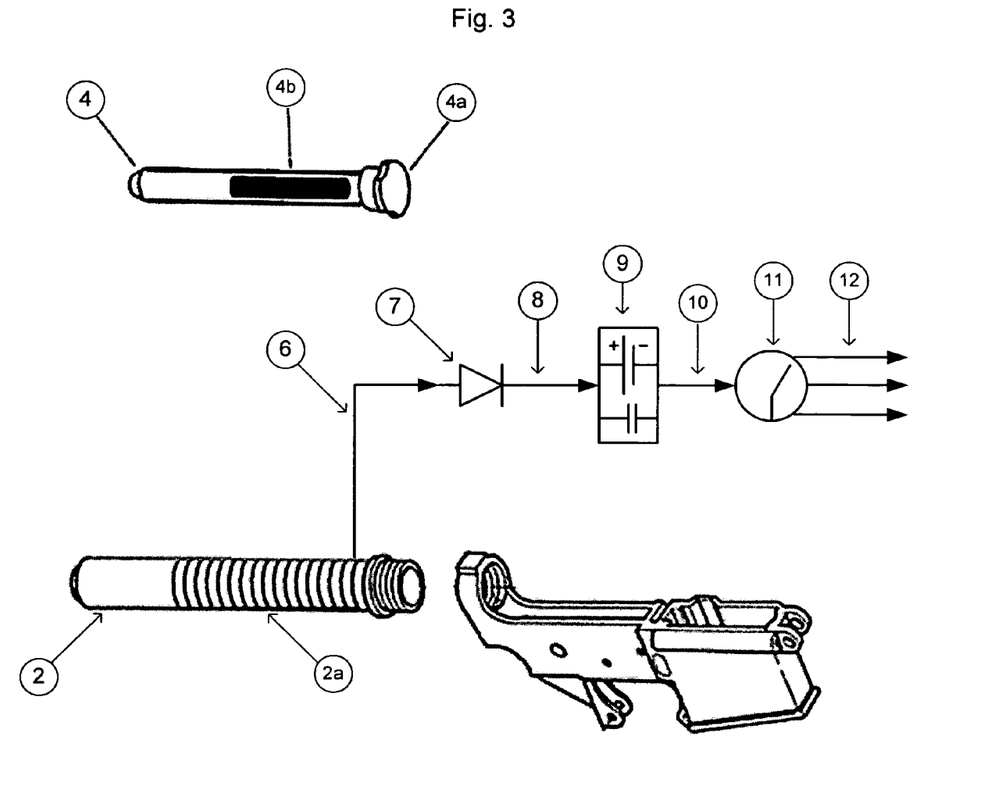
FIG. 3 depicts the lower of an AR-15 rifle as modified according to an embodiment of the present invention.

FIG. 3 depicts the modifications and additional components of which the invention is comprised.

First, a Conductor Assembly (2a) is constructed on or around the Buffer Tube (2). The Conductor Assembly comprises a group of loops of conductive wire, such as copper wire. As per Equation 1, the greater the number of loops of conductive wire, the greater the resulting EMF produced by the invention. Those skilled in the construction of mechanical devices may determine what type of conductive wire shall be used, the manner of installation, and the final number of loops of conductive wire. The Conductor Assembly may also be "installed" as an integral part of the Buffer Tube. Ideally, the Buffer Tube should be constructed of a nonconductive and nonferrous material, such as a strong polymer.

Next, a Magnetic Insert (4b) is installed in the Buffer Body (4). As per Equation 1, the greater the change of the magnetic flux, the greater the EMF produced by the invention, so a Magnetic Insert with an appropriate strength should be chosen. Ideally, the Buffer Body in which the Magnetic Insert is installed should be a nonconductive and nonferrous material, such as a strong polymer.

Wiring (6) is attached from the Conductor Assembly to a Rectifier or Diode (7) which transforms the alternating current generated by the invention to direct current. Wiring (8) is attached from the Rectifier/Diode to an electrical power storage unit, such as a Capacitor, Rechargeable Battery or a Recharging Station (9). The Recharging Station is a unit in which the rifle's operator may store rechargeable batteries of the type needed to power the electronic sights or the other electronic attachments installed on the rifle. In an embodiment in which the invention utilizes the Recharging Station, then components (10), (11) and (12), below, will be omitted. For the embodiment using the Recharging Station, the invention's operator will be required to install/remove the batteries to/from the Recharging Station as needed. In this embodiment, the operator will have the ability to remove fully charged batteries from the Recharging Station, install them in place of depleted batteries in the sights or other equipment attached to the rifle, and place the depleted batteries into the Recharging Station so that they may be recharged.

Should the invention utilize a Capacitor or Rechargeable Battery, Wiring (10) is attached from the Capacitor/Battery to a Switching Device (11) which is manually operated by the firearm's user, or which may be set to automatically switch should the primary means of power used by the firearm's electronic components fail. Wiring (12) is then attached from the switching device to the electronic components attached to the rifle. This Wiring (12) may include components to regulate the electric current from the Capacitor/Battery.

In another embodiment of the invention, the Switching Device (11) may be integrated with a type of "power rail" (not depicted) which acts as a distributor which delivers power to a plurality of electronic components attached to the firearm. It is not uncommon to have several electronic components attached to a firearm, and such a power rail acting as a distributor can be used to ensure that electric power is available to each electronic component attached to or incorporated into the firearm should any of their primary power sources fail.

Operation of the Invention

Figure 4A:
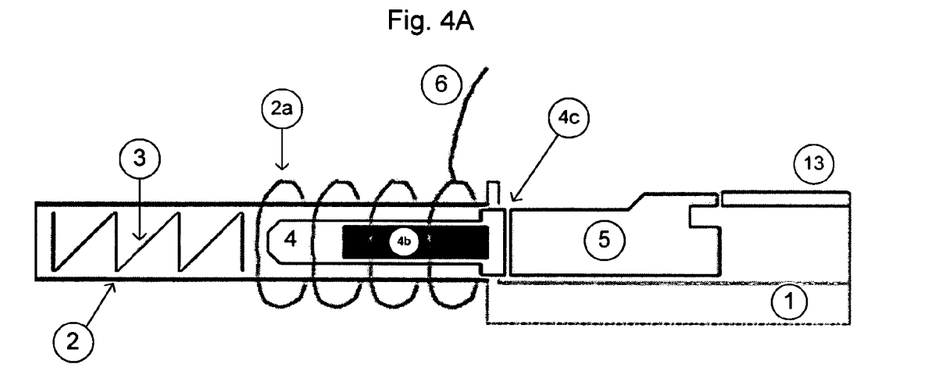
FIG. 4 depicts how the invention's modifications operate in conjunction with the AR-15 during the rifle's operation.
Figure 4B:
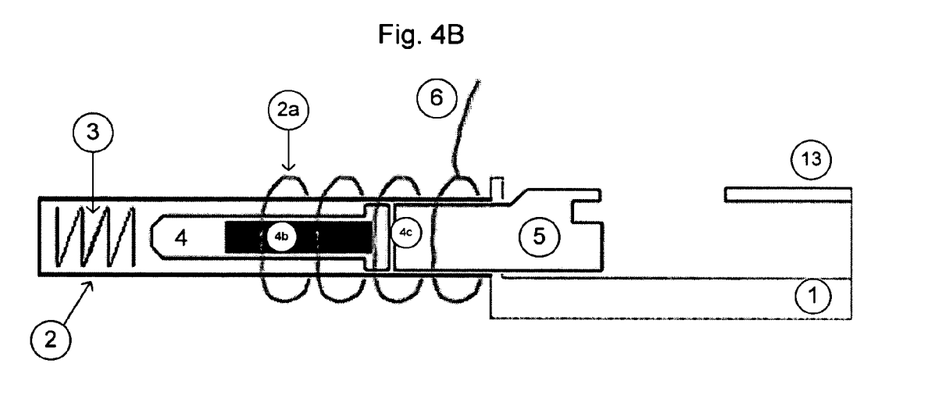
Figure 4C:
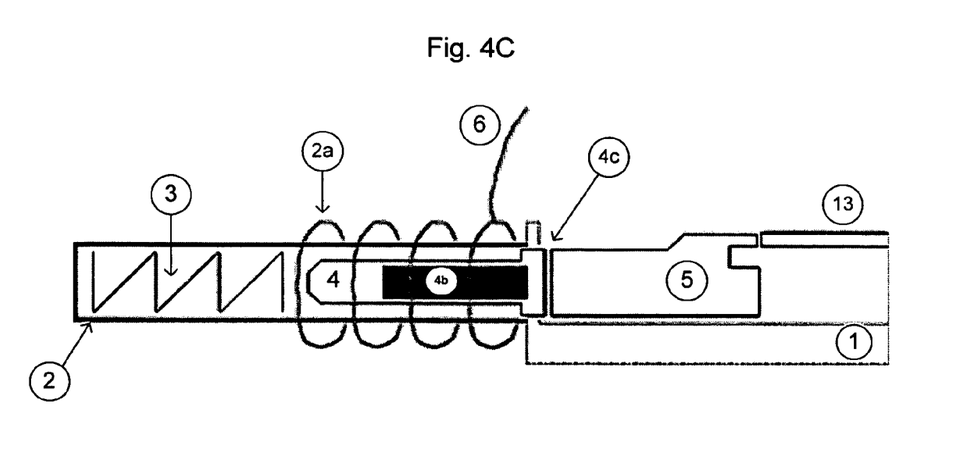

FIGS. 4A, 4B and 4C depict how the invention operates when used by the operator of the firearm. The invention shall produce electric energy, which is then stored in an electrical power storage unit, such as a Capacitor or Rechargeable Battery, as described herein. Should the firearm operator need a back-up source of power, the operator may manually operate the Switching Device (11) to provide power to the electronic component which needs such power.

FIG. 4A depicts the mechanism of an AR-15 when a cartridge is loaded in the firearm's firing chamber. The Bolt Carrier (5) is fully forward and the Buffer Spring (3) is fully extended.

FIG. 4B depicts the mechanism of the AR-15 as a user fires the rifle. When the user fires the firearm, the gas from the Gas Tube (13), which is attached to the gas port on the rifle's barrel (not pictured), impinges upon the Bolt Carrier, driving it backward against the modified Buffer Body (4). The modified Buffer Body moves into the modified Buffer Tube (2) and against the Buffer Spring. As the modified Buffer Body moves into the Buffer Tube, the Magnetic Insert (4b) inside the Buffer Body moves through the loops of the conductor in the Conductor Assembly (2a). As the modified Buffer Body moves backwards, its Magnetic Insert changes the magnetic flux on the Conductor Assembly, causing an EMF and a current to flow through the Wiring (6) as described according to Equation 1.

FIG. 4C depicts the mechanism of the AR-15 after the round has been fired. The Buffer Spring pushes the modified Buffer Body, its Magnetic Insert, and the Bolt Carrier forward. Again, the Magnetic Insert changes the magnetic flux on the Conductor Assembly, causing an EMF and a current to flow through the Wiring as described according to Equation 1.

As the AR-15 is used over a period of time, electric energy shall build up and be stored in the electrical power storage unit (the Capacitor or Rechargeable Battery), which may then be used as an alternative power source for electronic components attached to or part of the rifle upon operating the Switching Device, or in the batteries installed in the Recharging Station.

Implementing the Invention on Other Firearm Designs

The invention may be readily modified for the designs of other firearms. As an example, it may be implemented on a common firearm design in which a piston and push rod combination is used to cycle the bolt of the firearm. Such a design is used in the Heckler & Koch G-36 and XM-8 rifles.

Figure 5A:
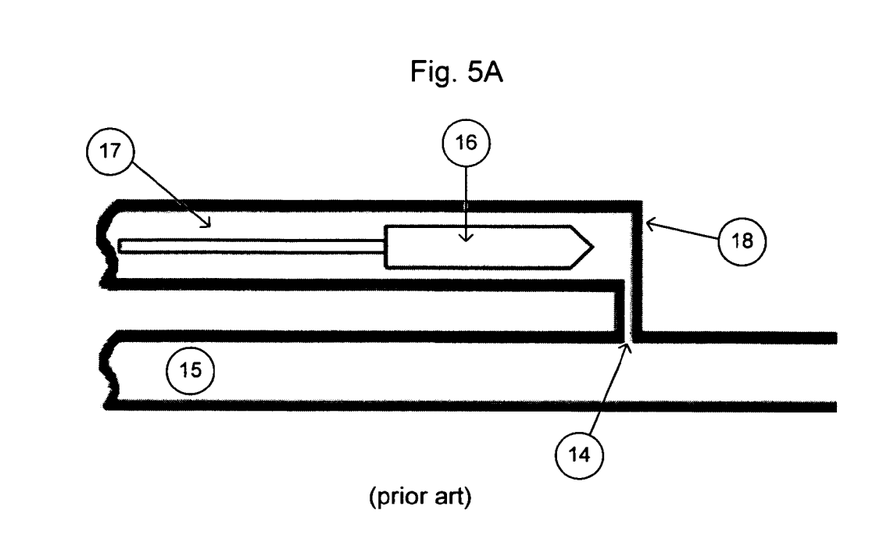
FIG. 5 depicts an embodiment in which the invention's modifications are made to the internal components of an alternative rifle design.

FIG. 5A illustrates the components of such a rifle design. The expanding propellant gas enters a gas port (14), which is an aperture in the firearm's barrel (15), and then pushes against a piston (16) and push rod (17), which are located in a gas cylinder (18). The gas cylinder may also act as a guide tube, a design seen in the AK-47 rifle and firearms derived from its design. In other firearms, such as the M-1 Garand, the gas cylinder only is present. To implement this embodiment of the invention, it may be necessary to add the guide tube to the firearm.

Figure 5B:
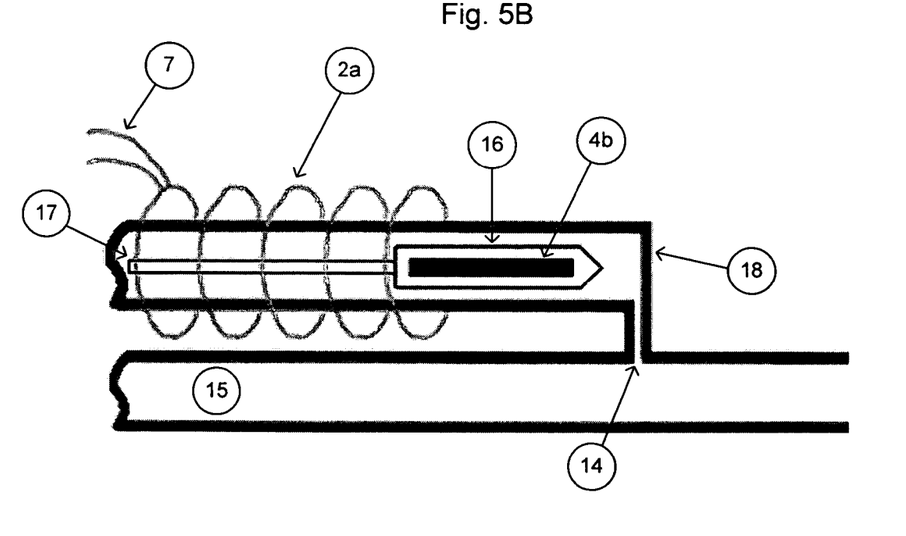

As seen in FIG. 5B, in an embodiment of the invention as implemented on such a rifle design, the conductor assembly (2a) may be added to or made a part of the gas cylinder or guide tube (18) and a magnetic insert (4b) added to the push rod or gas piston (16). As depicted in FIG. 5B, this embodiment of the invention operates as follows: the gas from the fired cartridge pushes the bullet down the barrel (15) and thereupon enters the gas port (14) after the bullet has passed the gas port (14). The gas entering the gas port (14) pushes against the piston (16) and push rod (17), thereby moving the magnetic insert (4b) through the coils of wiring in the conductor assembly (2a), thereby generating an electric current. The push rod (17) is attached to the bolt or bolt carrier of the rifle (not pictured) and operates the bolt or bolt carrier, thereby ejecting the spent cartridge casing.

When the piston (16) and push rod (17) have fully moved back within the rifle, and after the pressure on the piston/push rod has abated to a lower level, the recoil spring (not pictured) will push both the bolt/bolt carrier and the push rod (16) and piston (17) forward (thereby loading a new cartridge into the rifle's chamber). The magnetic insert (4b) will again move through the coils of wiring in the conductor assembly (2a), generating another electric current. During both steps, the electric current travels from the wiring (7) to a rectifier/diode (not pictured) and thereupon to an electric power storage unit (not pictured), and thereupon to an optional switching device (not pictured) as described above.

Those skilled in the art of firearm design may adapt the invention to incorporate it into any number of weapon systems, so long as the weapon system involves a component which is actuated as a result of the weapon's recoil. This actuated component would contain either the magnet or the loops of wire and would move the loops of wire through the magnetic field generated by the magnet as the weapon is operated.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

I claim:

1. A device for generating and storing electric power and attached to or made a part of a weapon comprised of a plurality of components, the device comprising:
   a magnet generating a magnetic field, the magnet installed in or on a first component of the weapon;
   a conductor assembly comprising a plurality of loops of electrically conductive wire, the conductor assembly installed in or on a second component of the weapon, wherein the first and second components are configured to move relative to each other;
   a firing chamber to generate a fluid pressure to drive movement of the first and second components relative to each other such that an electromotive force is generated;
   a rectifier or diode attached to the conductor assembly by a first set of electrically conductive wires; and
   an electric power storage unit attached to the rectifier or diode by a second set of electrically conductive wires.

2. The device of claim 1, wherein the weapon is selected from the group consisting of a rifle, a semiautomatic rifle, an automatic rifle, a pistol and a firearm.

3. The device of claim 1, wherein the movable first component of the weapon is either the piston of the weapon or the push rod of the weapon.

4. The device of claim 1, wherein the second component of the weapon is the guide tube for the push rod of the weapon.

5. The device of claim 2, wherein the first component of the weapon is either the piston of the weapon or the push rod of the weapon.

6. The device of claim 2, wherein the second component of the weapon is the guide tube for the push rod of the weapon.

7. The device of claim 1, wherein the electric power storage unit is selected from the group consisting of a battery capacitor and a recharging station for rechargeable batteries.

8. The device of claim 2, wherein the electric power storage unit is selected from the group consisting of a battery, capacitor and a recharging station for rechargeable batteries.

9. The device of claim 1, further comprising a switching device, the switching device attached to the electric power storage unit by a third set of electrically conductive wires, the switching device providing an electric current from the electric power storage unit to one or more electronic devices attached to the weapon when the switching device is activated by the operator of the weapon.

10. The device of claim 9, further comprising a power rail unit, the power rail unit attached to the switching device by a fourth set of electrically conductive wires, the power rail unit providing a point at which the electric energy stored in the electric power storage unit is distributed to the one or more electronic devices attached to the weapon using electrical points of contact between the power rail unit and the one or more electronic devices attached to the weapon.

11. The device of claim 2, further comprising a switching device, the switching device attached to the electric power storage unit by a third set of electrically conductive wires, the switching device providing an electric current from the electric power storage unit to one or more electronic devices attached to the weapon when the switching device is activated by the operator of the weapon.

12. The device of claim 11, further comprising a power rail unit, the power rail unit attached to the switching device by a fourth set of electrically conductive wires, the power rail unit providing a point at which the electric energy stored in the electric power storage unit is distributed to the one or more electronic devices attached to the weapon using electrical points of contact between the power rail unit and the one or more electronic devices attached to the weapon.

13. A rifle comprising:
   a buffer body that includes a magnet generating a magnetic field, the magnet installed in the buffer body of the rifle;
   a buffer tube that includes a conductor assembly having a plurality of loops of electrically conductive wire configured in or on the buffer tube so that the buffer body moves through the plurality of loops of electrically conductive wire;
   a firing chamber to generate a fluid pressure to drive movement of the buffer body through the plurality of loops of electrically conductive wire;
   a rectifier or diode attached to the conductor assembly by a first set of electrically conductive wires; and
   an electric power storage unit attached to the rectifier or diode by a second set of electrically conductive wires.

14. The device of claim 13, wherein the electric power storage unit is selected from the group consisting of a battery, capacitor and a recharging station for rechargeable batteries.

15. The device of claim 13, further comprising a switching device, the switching device attached to the electric power storage unit by a third set of electrically conductive wires, the switching device providing, an electric current from the electric power storage unit to one or more electronic devices attached to the rifle when the switching device is activated by the operator of the rifle.

16. The device of claim 15, further comprising a power rail unit, the power rail unit attached to the switching device by a fourth set of electrically conductive wires, the power rail unit providing a point at which the electric energy stored in the electric power storage unit is distributed to the one or more electronic devices attached to the rifle using electrical points of contact between the power rail unit and the plurality of electronic devices attached to the rifle.

17. A weapon able to generate and store electric power when the weapon is operated, the weapon comprising:
   first and second components;
   a magnet generating a magnetic field, the magnet installed in or on the first component of the weapon;
   a conductor assembly comprising a plurality of loops of electrically conductive wire, the conductor assembly installed in or on the second component of the weapon, wherein the first and second components are configured to move relative to each other;
   a firing chamber to generate a fluid pressure to drive movement of the first and second components relative to each other such that an electromotive force is generated;
   a rectifier or diode attached to the conductor assembly by a first set of electrically conductive wires; and
   an electric power storage unit attached to the rectifier or diode by a second set of electrically conductive wires.

18. The weapon of claim 17, wherein the weapon is selected from the group consisting of a rifle, a semiautomatic rifle, an automatic rifle, a pistol and a firearm.

19. The weapon of claim 17, wherein the electric power storage unit is selected from the group consisting of a battery, capacitor and a recharging station for rechargeable batteries.

20. The weapon of claim 17, further comprising a switching device, the switching device attached to the electric power storage unit by a third set of electrically conductive wires, the switching device providing an electric current from the electric power storage unit to one or more electronic devices attached to the weapon when the switching device is activated by the operator of the weapon.

* * * * *